US011615016B2

(12) United States Patent
Tangirala et al.

(10) Patent No.: US 11,615,016 B2
(45) Date of Patent: Mar. 28, 2023

(54) SYSTEM AND METHOD FOR EXECUTING A TEST CASE

(71) Applicant: HCL Technologies Limited, New Delhi (IN)

(72) Inventors: Srinivas Tangirala, Hyderabad (IN); Narender Siddhamshetty, Hyderabad (IN); Subramanyam Palivela, Hyderabad (IN); Srihari Varadharajan, Chennai (IN); Ravinder Kundarapu, Hyderabad (IN); Ramakrishna Narayanan, Chennai (IN)

(73) Assignee: HCL Technologies Limited, New Delhi (IN)

( * ) Notice: Subject to any disclaimer, the term of this patent is extended or adjusted under 35 U.S.C. 154(b) by 89 days.

(21) Appl. No.: 17/145,723

(22) Filed: Jan. 11, 2021

(65) Prior Publication Data
US 2021/0232495 A1     Jul. 29, 2021

(30) Foreign Application Priority Data
Jan. 23, 2020 (IN) .............................. 202011003101

(51) Int. Cl.
*G06F 11/36* (2006.01)
*G06F 40/284* (2020.01)
(Continued)

(52) U.S. Cl.
CPC ...... *G06F 11/3688* (2013.01); *G06F 11/3684* (2013.01); *G06F 11/3692* (2013.01);
(Continued)

(58) Field of Classification Search
CPC ............. G06F 11/3688; G06F 11/3684; G06F 11/3692; G06F 40/284; G06F 40/216;
(Continued)

(56) References Cited

U.S. PATENT DOCUMENTS 7,631,227 B2    12/2009  Poisson et al.
8,875,092 B2 *  10/2014  Gupta ................. G06F 11/3664
                                                                717/102
(Continued)

OTHER PUBLICATIONS

Pasareanu, Corina S., et al. "Combining unit-level symbolic execution and system-level concrete execution for testing NASA software." Proceedings of the 2008 international symposium on Software testing and analysis. 2008. pp. 15-26 (Year: 2008).*
(Continued)

*Primary Examiner* — Satish Rampuria (57) ABSTRACT

Disclosed is a system (102) for executing a test case. The system (102) comprises a memory (206) and a processor (202). The system (102) receives a test file in a predefined format. The test file comprises a test case comprising one or more test steps, test data and one or more expected results for execution. Further, each test step from the one or more test steps indicates an action to be performed for executing the test case. The system (102) generates one or more tokens by classifying text associated with the one or more test steps. The system (102) generates an output template associated with the test case based on analysing the one or more tokens. The system (102) executes the test case based on one or more controls associated with the test case in the output template. The one or more controls are dynamically identified from the output template.

16 Claims, 3 Drawing Sheets

(51) Int. Cl.
  *G06N 20/00* (2019.01)
  *G06N 5/04* (2006.01)

(52) U.S. Cl.
  CPC ............ *G06F 40/284* (2020.01); *G06N 5/04* (2013.01); *G06N 20/00* (2019.01)

(58) Field of Classification Search
  CPC .... G06F 40/279; G06F 40/295; G06F 40/186; G06N 5/04; G06N 20/00
  USPC .................................................. 717/124–167
  See application file for complete search history.

(56) References Cited

U.S. PATENT DOCUMENTS

| | | | |
|---|---|---|---|
| 10,204,035 B1 | 2/2019 | Surace et al. | |
| 2005/0166094 A1* | 7/2005 | Blackwell | G06F 11/3664 714/38.14 |
| 2007/0168734 A1* | 7/2007 | Vasile | G06F 11/3672 714/33 |
| 2010/0146489 A1* | 6/2010 | Ortiz | G06F 11/3688 717/128 |
| 2015/0294250 A1* | 10/2015 | Anerousis | G06Q 10/0635 705/7.28 |
| 2018/0276110 A1* | 9/2018 | Shankar | G06F 40/10 |
| 2018/0373620 A1 | 12/2018 | Thomson | |
| 2019/0005018 A1* | 1/2019 | Sharma | G06F 40/40 |
| 2019/0079853 A1 | 3/2019 | Makkar | |
| 2022/0058114 A1* | 2/2022 | Ranjan Jena | G06F 16/24553 |

OTHER PUBLICATIONS

Ko, Andrew, and Brad Myers. "Debugging reinvented." 2008 ACM/IEEE 30th International Conference on Software Engineering. IEEE, 2008.pp.301-310 (Year: 2008).*

Necula, George C. "Translation validation for an optimizing compiler." Proceedings of the ACM SIGPLAN 2000 conference on Programming language design and implementation. 2000.pp.83-94 (Year: 2000).*

Ammann, Paul E., Paul E. Black, and William Majurski. "Using model checking to generate tests from specifications." Proceedings second international conference on formal engineering methods (Cat. No. 98EX241). IEEE, 1998.pp.46-54 (Year: 1998).*

Yuan, Xun, and Atif M. Memon. "Using GUI run-time state as feedback to generate test cases." 29th International Conference on Software Engineering (ICSE'07). IEEE, 2007.pp.396-405 (Year: 2007).*

Wang, L. I. N. G. F. E. N. G. "Issues on software testing for safety-critical real-time automation systems." The 23rd Digital Avionics Systems Conference (IEEE Cat. No. 04CH37576). vol. 2. IEEE, 2004.pp.(10.B.2-1)-(10.B.2-12) (Year: 2004).*

* cited by examiner

SYSTEM AND METHOD FOR EXECUTING A TEST CASE

CROSS-REFERENCE TO RELATED APPLICATIONS AND PRIORITY

This patent application does not claim priority from any application. The present application claims benefit from Indian Complete Patent Application No. 202011003101 filed on 23 Jan. 2020 the entirety of which is hereby incorporated by reference.

TECHNICAL FIELD

The present disclosure in general relates to the field of a software testing. More particularly, the present invention relates to system and method for executing a test case.

BACKGROUND

A software testing process validates one or more actual test results with one or more expected test results. The software testing process is used to ensure that a software is free of defects. A conventional software testing process is a combination of a manual and an automation process. The automation process comprises understanding of one or more manual test cases and creating one or more automation test scripts using one or more open source or commercial tools. The automation test scripts are developed in tool specific language and functions. Typically, the conventional software testing process consumes high manual efforts and high duration for completion.

SUMMARY

Before the present system and method for executing a test case is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to the system and method for executing a test case. This summary is not intended to identify essential features of the claimed subject matter nor is it intended for use in determining or limiting the scope of the claimed subject matter.

In one implementation, a system for executing a test case is illustrated. The system may comprise a memory and a processor coupled to the memory. The processor may be configured to execute instructions stored in the memory to receive a test file in a predefined format. The test file may comprise a test case comprising test data, one or more test steps, and one or more expected results associated with an execution of the test case. Further, each test step from the one or more test steps may indicate an action to be performed for executing the test case. The processor may be configured to execute instructions stored in the memory to generate one or more tokens by classifying text associated with the one or more test steps. The text may be classified based on a processing of the one or more test steps. The processor may be further configured to execute instructions stored in the memory to generate an output template associated with the test case based on analysing the one or more tokens. The processor may be further configured to execute instructions stored in the memory to execute the test case based on one or more controls associated with the one or more test steps in the output template. The one or more controls may be dynamically identified from the output template.

In another implementation, a method for execution of a test case is illustrated. The method may comprise receiving, by a processor, a test file in a predefined format. The test file may comprise a test case comprising test data, one or more test steps, and one or more expected results associated with an execution of the test case. Further, each test step from the one or more test steps may indicate an action to be performed for executing the test case. The method may further comprise generating, by the processor, one or more tokens by classifying text associated with the one or more test steps. The text may be classified based on a processing of the one or more test steps. The method may further comprise generating, by the processor, an output template associated with the test case based on analysing the one or more tokens. The method may further comprise executing, by the processor, the test case based on one or more controls associated with the one or more test steps in the output template. The one or more controls may be dynamically identified from the output template.

BRIEF DESCRIPTION OF DRAWINGS

The detailed description is described with reference to the accompanying figures. In the figures, the left-most digits(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "comprising", "receiving", "determining", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, system and method for executing a test case are now described. The disclosed embodiments of the system and method for executing a test case are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for system and method for executing a test case is not intended to be limited to the embodiments illustrated, but is to be accorded the widest scope consistent with the principles and features described herein.

A conventional process of software testing may be a combination of manual and automation processes. The automation process may comprise understanding of one or more manual test cases and creating automation test scripts using one or more open source or commercial tools. The automation test scripts may be developed in tool specific language and functions. Typically, the conventional process may consume high manual efforts and high duration for completion. Further, the conventional process may require highly skilled automation developers to perform an execution of the test cases. Furthermore, the conventional process may involve multiple times of execution before release of a product or an application to market. In addition, the conventional process may offer limited timelines to perform the execution of the test cases. The conventional process may require high maintenance efforts for implementing any changes in a product functionality.

The present subject matter overcomes the problem of the conventional process. The present subject matter relates to a system for executing a test case using Machine Learning technique. The system may be configured to receive a test file in a predefined format. The test file may comprise a test case. The test case may comprise one or more test steps, test data and one or more expected results associated with the execution of the test case. Further, each test step from the one or more test steps may indicate an action to be performed for executing the test case. Further, the system may generate one or more tokens by classifying text associated with the one or more test steps. The text may be classified based on processing of the one or more test steps. The processing of the one or more test steps may be performed using Natural Language Processing (NLP) technique. Further, the system may generate an output template associated with the test case based on analysing the one or more tokens. The analysis of the text to generate the output template may be performed using Machine Learning technique. The output template may comprise one or more columns. The one or more columns may comprise a test case ID, a test step ID, one or more controls, a control text, an event, and data associated with each test step. Further, the system may execute the test case based on the one or more controls associated with the test case in the output template. The one or more controls may be dynamically identified from the output template. The execution of the test case may be performed using an Automation Engine.

The system does away with the process of developing automation test scripts in tool specific language and functions for executing the test case. The system may generate a processed test case in an easily understandable and user friendly manner. The system may eliminate a requirement of an automation code or script. Further, the system does away with the problem of requiring highly skilled automation developers with high manual efforts to perform the execution of the test case. The system may enable manual testers, business users and domain consultants to write manual scripts in plain English language and execute on a target platform or a browser without having test automation scripts. It is to be noted that the system may lead to an overall improvement in the process of the execution of the test case through script less automation.

Figure 1:
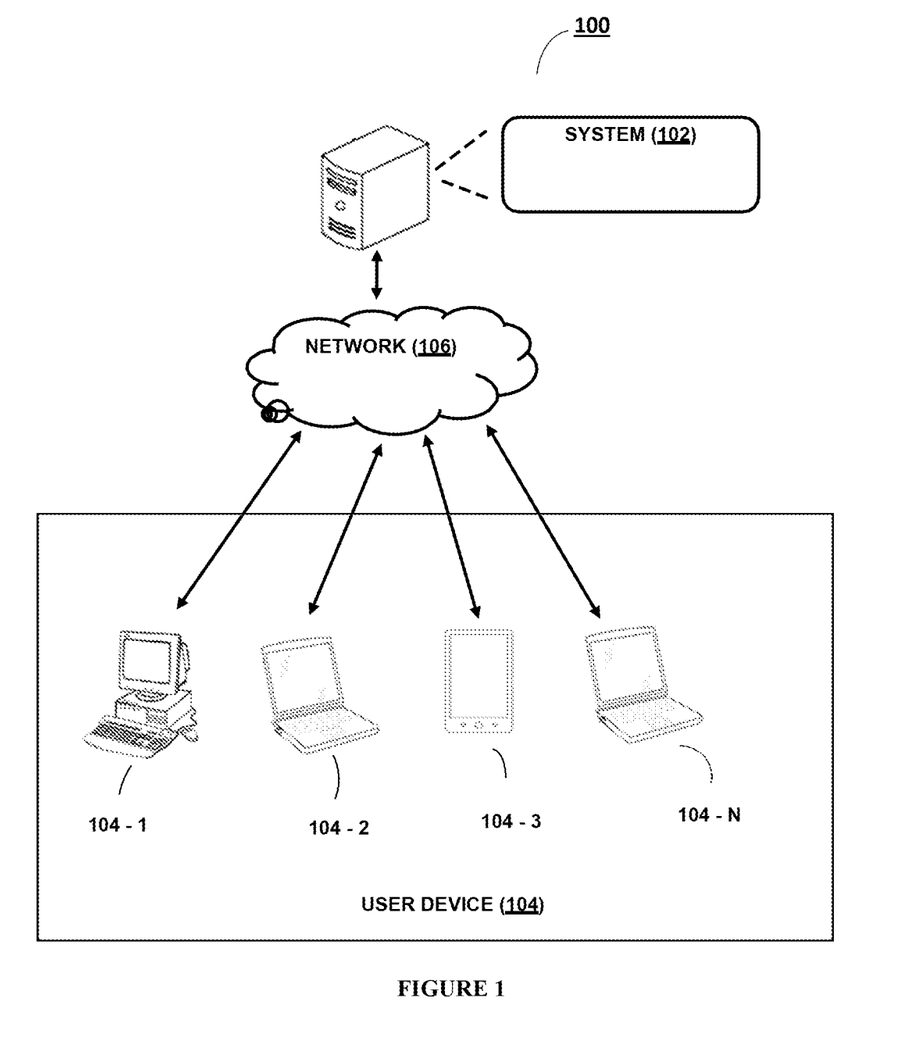
FIG. 1 illustrates a network implementation of a system 102 for executing a test case, in accordance with an embodiment of the present subject matter.

Referring now to FIG. 1, a network implementation 100 of a system 102 for executing a test case is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to receive a test file in a predefined format. The test file may comprise a test case. The test case may comprise one or more test steps, test data and one or more expected results associated with an execution of the test case. Further, each test step from the one or more test steps may indicate an action to be performed for executing the test case. Further, the system 102 may generate one or more tokens by classifying text associated with the one or more test steps. The text may be classified based on processing of the one or more test steps. The processing of the one or more test steps may be performed using a Natural Language Processing (NLP) technique. Further, the system 102 may generate an output template associated with the test case based on analysing the one or more tokens. The analysis of the text to generate the output template may be performed using a Machine Learning technique. The output template may comprise one or more columns. The one or more columns may comprise a test case ID, a test step ID, one or more controls, a control text, an event, and data associated with each test step. Further, the system 102 may execute the test case based on the one or more controls associated with the test case in the output template. The one or more controls may be dynamically identified from the output template. The execution of the test case may be performed using an Automation Engine.

Figure 2:
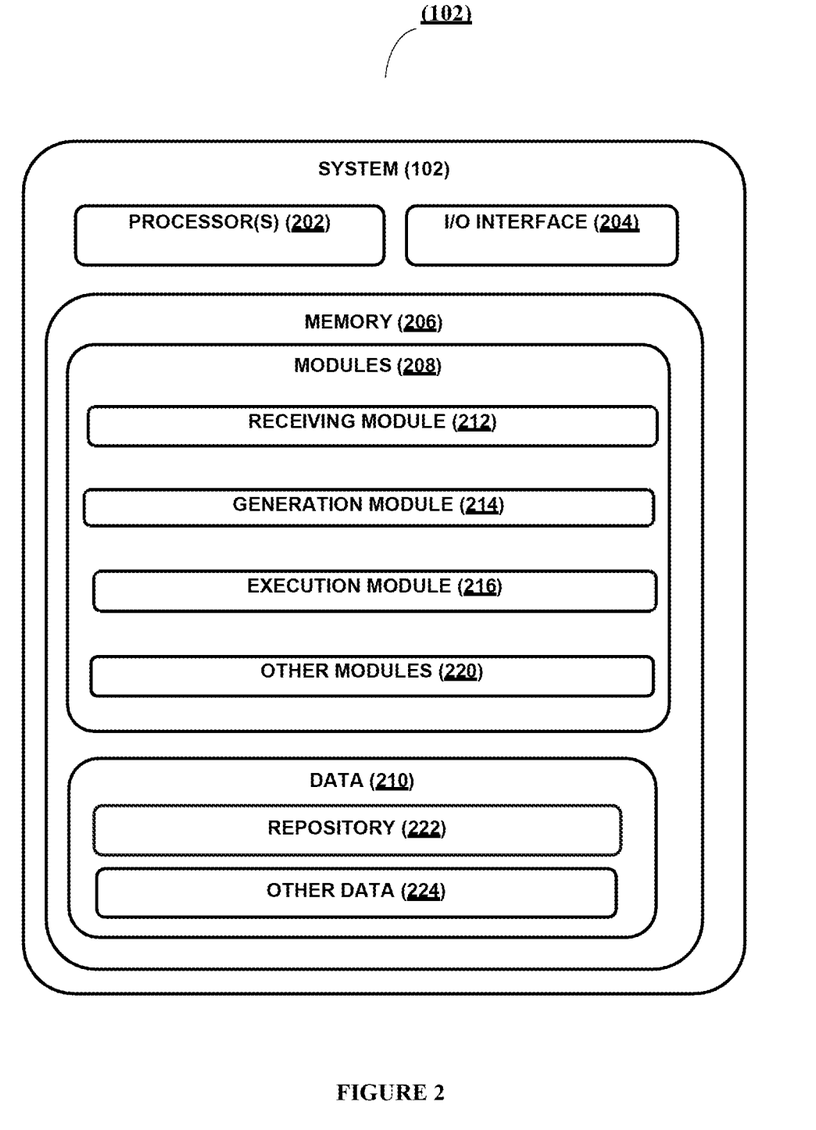
FIG. 2 illustrates a schematic diagram of a system 102 for executing a test case, in accordance with an embodiment of the present subject matter.

Referring now to FIG. 2, a system 102 for executing a test case is illustrated in accordance with an embodiment of the present subject matter.

In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, a generation module 214, an execution module 216, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may be configured to receive a test file in a predefined format from a Test Data Management (TDM) system such as a Quality Center (QC), an Application Life Cycle Management (ALM) and the like. The test file may comprise manual text written in plain English language by a user. The test file may be received as an XLSX, a DOCX or a PDF document. The test file may comprise a test case. Further, the predefined format of the test case is shown below in Table 1.

TABLE 1

| Test Case Format | | | |
| --- | --- | --- | --- |
| Step No. | Test Steps | Test Data | Expected Results |

The predefined format of the test case may comprise a step number, one or more test steps, test data, and one or more expected results associated with an execution of the test case. Further, each test step from the one or more test steps may indicate an action to be performed for executing the test case.

Upon receiving of the test file, the generation module 214 may be configured to generate one or more tokens associated with the one or more test steps. The one or more tokens may be generated by classifying text associated with the one or more test steps. The classification may be a two-step process. In the first step, the given test step may be split into one or more tokens. The one or more tokens may be then classified as control, control text, event, and test data. The classification of the text may be performed using a Natural Language Processing (NLP) technique. The Natural Language Processing (NLP) technique may be used to perform a processing on the one or more test steps in order to create one or more indexes associated with the one or more test steps. The NLP technique may utilize one or more algorithms such as a lemmatization, a Parts of Speech (POS) tagging, a Dependency Parser, a Named Entity Recognition (NER) for the processing. Further, the NLP technique may generate one or more keywords from the text associated with the one or more test steps.

Further, the generation module 214 may generate an output template associated with the test case. In one embodiment, the table 2 shows the output template.

TABLE 2

| Output Template | | | | | |
| --- | --- | --- | --- | --- | --- |
| Test Case ID | Test Step ID | Control | Control Text | Event | Data |
| S1_TC_01 | S1_TC_01_001 | | | openBrowser | IE |
| S1_TC_01 | S1_TC_01_002 | | M3 application | go | |
| S1_TC_01 | S1_TC_01_003 | | | authenticateApp | |
| S1_TC_01 | S1_TC_01_004 | | | keyboardCtrlR | |
| S1_TC_01 | S1_TC_01_005 | textbox | Program | enterText | PPS170 |
| S1_TC_01 | S1_TC_01_006 | | | keyboardEnter | |
| S1_TC_01 | S1_TC_01_007 | button | Actions | click | |
| S1_TC_01 | S1_TC_01_008 | button | Settings | click | |
| S1_TC_01 | S1_TC_01_009 | link | Opening panel | verify | |
| S1_TC_01 | S1_TC_01_010 | link | Panel Sequence | verifyText | XXX |
| S1_TC_01 | S1_TC_01_011 | button | Next | click | |

The output template may be generated based on analysing the one or more tokens associated with the test case. The generation module 214 may utilize a Machine Learning technique for analysing the text associated with the test case. The output template may comprise one or more columns. The one or more columns may comprise a test case ID, a test step ID, one or more controls, a control text, an event, and data associated with each test step. The test case ID may indicate a unique ID of the test case. Further, the test step ID may indicate a unique ID of the test step. The one or more controls may be web controls such as button, link, and the like associated with each test step. The one or more controls may enhance user interaction. Further, the control text may indicate one or more actions associated with the one or more controls. The event may indicate one or more events associated with the test case to be implemented. The data may indicate data associated with each test step. In one aspect, the generation module 214 may generate the output template in a format understandable by an Automation Engine.

Upon generation of the output template, the execution module 216 may execute the test case based on the one or more controls associated with the one or more test steps in the output template. The one or more controls may be dynamically identified from the output template. The execution may be performed using the Automation Engine. The Automation Engine may execute the test case automatically in a Continuous Integration/Continuous Deployment (CI/CD) mode. The Automation Engine may dynamically extract one or more processed test case details and dynamically inspect one or more controls based on information in the output template. The Automation Engine may look to identify the Control Text of a particular Test Step in a page source (web page). The Automation Engine may try to match the Control Type with Test Step Control from output template on identifying the Control Text. Further, the Automation Engine may dynamically extract the element details of that control and construct the unique element identifier based on these details. As an example from above Table 2, Step 7, Control is "Button" and Control Text is "Actions". The Automation Engine may first look to identify of the "Actions" text in web page. Once this text is found, the Automation Engine may further compare the Control "Button" with the identified element details. Based on the comparison, the Automation Engine may further extract the locator details like ID, Name, Class of that element and construct the unique element identifier path for that element. Further, one or more element identifiers may be dynamically and automatically generated. The element identifiers may be filled into the output template during a validation stage. Further, the information in the output template may be used to execute the test case directly without any code created. Furthermore, the execution may be performed without any scripting knowledge such that even a test engineer, a business analyst or a functional consultant may test an Application Under Test (AUT) against a target environment with a compatible browser in an automated way.

Further, the system 102 may be configured to capture a current execution result associated with the test case based on the execution of the test case. Furthermore, the current execution result may be compared with the one or more expected results to generate an execution data. In one aspect, the system 102 may generate a succeeded test case when the current execution result may be same as the one or more expected results. In another aspect, the system 102 may generate a failed test case when the current execution result may be different from the one or more expected results. Further, the system 102 may generate a summary report. The summary report may be an overall report of the execution data. The execution data may indicate one or more executed test cases, one or more succeeded test cases, and one or more failed test cases. Further, the system 102 may generate a detailed report. The detailed report may be configured to generate one or more details of the execution of each test step from the one or more test steps. The detailed report may show a comparison of the one or more expected results and the current execution result for each step from the one or more test steps.

Figure 3:
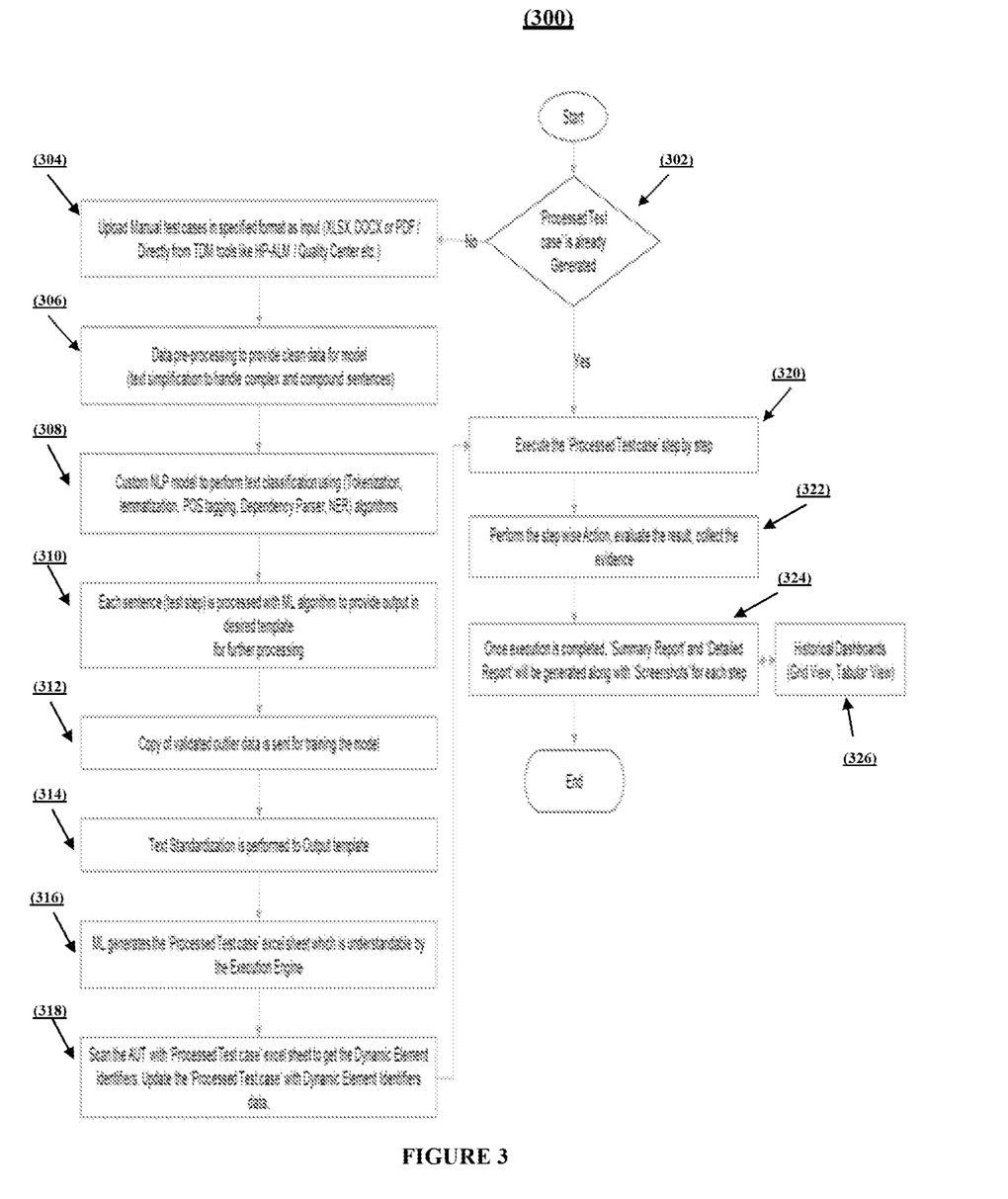
FIG. 3 illustrates a method 300 for executing a test case, in accordance with an embodiment of the present subject matter.

Referring now to FIG. 3, a method 300 for executing a test case, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the system 102 may determine if a processed test case is already generated.

At block 304, if the processed test case is not generated, the system 102 may receive a test file. The test file may be received in a predefined format from a Test Data Management (TDM) system such as a Quality Center (QC), an Application Life Cycle Management (ALM) and the like. The test file may comprise manual text written in plain English language by a user. The test file may be a received as an XLSX, a DOCX or a PDF document. The test file may comprise a test case. The predefined format for the test case may comprise a step number, one or more test steps, test data, and one or more expected results associated with an execution of the test case. Further, each test step from the one or more test steps may indicate an action to be performed for executing the test case.

At block 306, a processing on the test case may be performed using a Natural Language Processing (NLP) technique. The NLP technique may utilize one or more algorithms such as a lemmatization, a Parts of Speech (POS) tagging, a Dependency Parser, a Named Entity Recognition (NER) for the processing. The processing may comprise generation of one or more tokens by classifying text associated with the one or more test steps. Further, the NLP technique may generate one or more keywords from the text associated with the one or more test steps.

At block 308, the one or more test steps may be analysed using a Machine Learning technique to generate an output template. The output template may comprise one or more columns. The one or more columns may comprise a test case ID, a test step ID, one or more controls, a control text, an event, and data associated with each test step. The test case ID may indicate a unique ID of the test case. Further, the test step ID may indicate a unique ID of the test step. The one or more controls may be web controls such as button, link, and the like associated with each test step. The one or more controls may enhance user interaction. Further, the control text may indicate one or more actions associated with the one or more controls. The event may indicate one or more events associated with the test case to be implemented. The data may indicate data associated with each test step.

At block 310, a copy of validated outlier data may be sent for training a Machine Learning model. The Machine Learning Model may classify the words in a sentence (Test Case) to predefined entities such as Control, Control Text, Test Data, and Event. The predefined Action template, which acts as an output, will be filled with the entities derived from the Test case.

At block 312, a text standardization technique may be performed on the output template. The text standardization technique may comprise normalization of information associated with the output template. The test steps incorrectly predicted by the model may be updated to existing corpus and sent for retraining as and when required.

At block 316, an excel sheet comprising one or more processed test case details of the output template may be generated by the Machine Learning technique. The excel sheet may be generated in a format understandable by an Automation Engine.

At block 318, an Automation Under Test (AUT) may be scanned with the excel sheet to obtain one or more dynamic element identifiers. Further, the excel sheet may be updated with the one or more dynamic element identifiers.

At block 320, the test case may be executed step by step by the Automation Engine. The Automation Engine may execute the test case based on the one or more controls associated with the test case in the output template. The one or more controls may be dynamically identified from the output template. Further, a current execution result associated with the test case based on the execution of the test case may be captured.

At block 322, a step wise action may be performed to complete the test execution along with evaluating a result of the execution when necessary. Along with execution, evidence may also be collected and associated with each Test Step.

At block 324, a summary report may be generated. The current execution result may be compared with the one or more expected results to generate an execution data. The summary report may be an overall report of the execution data. The execution data may indicate one or more executed test cases, one or more succeeded test cases, and one or more failed test cases. In one aspect, the system 102 may generate a succeeded test case when the current execution result may be same as the one or more expected results. In another aspect, the system 102 may generate a failed test case when the current execution result may be different from the one or more expected results. Further, a detailed report may be generated. The detailed report may be configured to generate one or more details of the execution of each test step from the one or more test steps. The detailed report may show a comparison of the one or more expected results with the current execution result.

At block 326, a historical dashboard may be configured to display the summary report and the detailed report.

Exemplary embodiments discussed above may provide certain advantages. Though not required to practice aspects of the disclosure, these advantages may include those provided by the following features.

Some embodiments of the system and the method may enable easy test maintenance during the execution of the test case.

Some embodiments of the system and the method may be configured to integrate with Continuous Integration and Continuous Development (CI/CD) tools to enable continuous testing.

Some embodiments of the system and the method may be configured to seamlessly integrate with Agile and DevOps framework.

Some embodiments of the system and the method may eliminate a requirement of creating automation scripts, thereby enabling script less automation.

Some embodiments of the system and method may enable manual testers, business users and domain consultants to write manual scripts in plain English language and execute on a target system without having test automation script.

Some embodiments of the system and method may enable ShiftLeft testing.

Some embodiments of the system and method may eliminate a requirement of skilled automation developers for performing an execution of test cases.

Although implementations for system and method for executing a test case, it is to be understood that the appended claims are not necessarily limited to the specific features or methods described. Rather, the specific features and methods are disclosed as examples of implementations for executing a test case.

The invention claimed is:

1. A system (102) for executing a test case, the system (102) comprising:
 a memory (206);
 a processor (202) coupled to the memory (206), wherein the processor (202) is configured to execute instructions stored in the memory (206) to:
  receive a test file in a predefined format, wherein the test file comprises a test case comprising test data, one or more test steps, and one or more expected results associated with an execution of the test case, and wherein each test step from the one or more test steps indicates an action to be performed for executing the test case;
  generate one or more tokens by classifying text associated with the one or more test steps,
   wherein the text is classified based on a processing of the one or more test steps;
   wherein each of the one or more test steps is segregated into the one or more tokens, and
   wherein the one or more tokens are classified into one or more controls, control text, event, and test data;
  generate an output template associated with the test case based on analysing the one or more tokens; and
  execute the test case based on the one or more controls associated with the one or more test steps in the output template, wherein the one or more controls are dynamically identified from the output template.

2. The system (102) as claimed in claim 1, further configured to capture a current execution result associated with the test case based on the execution of the test case, wherein the current execution result is further compared with the one or more expected results to generate an execution data.

3. The system (102) as claimed in claim 1, further configured to generate a summary report, wherein the summary report comprises the execution data, and wherein the execution data indicates one or more executed test cases, one or more succeeded test cases, and one or more failed test cases.

4. The system (102) as claimed in claim 3, wherein the one or more succeeded test cases may be generated when the current execution result is same as the one or more expected results, and wherein the one or more failed test cases may be generated when the current execution result is different from the one or more expected results.

5. The system (102) as claimed in claim 1, wherein the processing of the one or more test steps is performed using a Natural Language Processing (NLP) technique.

6. The system (102) as claimed in claim 1, wherein the analysis of the text is performed using a Machine Learning technique.

7. The system (102) as claimed in claim 1, wherein the output template comprises one or more columns, and wherein the one or more columns indicate a test case ID, a test step ID, the one or more controls, a control text, an event, and data associated with each test step.

8. The system (102) as claimed in claim 1, wherein the execution is performed using an Automation Engine.

9. A method (300) for executing a test case, wherein the method (300) comprises:
　　receiving, by a processor (202), a test file in a predefined format, wherein the test file comprises a test case comprising test data, one or more test steps, and one or more expected results associated with an execution of the test case, and wherein each test step from the one or more test steps indicates an action to be performed for executing the test case;
　　generating, by the processor (202), one or more tokens by classifying text associated with the one or more test steps,
　　　　wherein the text is classified based on a processing of the one or more test steps;
　　　　wherein each of the one or more test steps is segregated into the one or more tokens, and
　　　　wherein the one or more tokens are classified into one or more controls, control text, event, and test data;
　　generating, by the processor (202), an output template associated with the test case based on analysing the one or more tokens; and
　　executing, by the processor (202), the test case based on the one or more controls associated with the one or more test steps in the output template, wherein the one or more controls are dynamically identified from the output template.

10. The system (102) as claimed in claim 1, further configured to capture a current execution result associated with the test case based on the execution of the test case, wherein the current execution result is further compared with the one or more expected results to generate an execution data.

11. The method (300) as claimed in claim 9, further configured to generate a summary report, wherein the summary report comprises the execution data, and wherein the execution data indicates one or more executed test cases, one or more succeeded test cases, and one or more failed test cases.

12. The method (300) as claimed in claim 11, wherein the one or more succeeded test cases may be generated when the current execution result is same as the one or more expected results, and wherein the one or more failed test cases may be generated when the current execution result is different from the one or more expected results.

13. The method (300) as claimed in claim 9, wherein the processing of the one or more test steps is performed using a Natural Language Processing (NLP) technique.

14. The method (300) as claimed in claim 9, wherein the analysis of the text is performed using a Machine Learning technique.

15. The method (300) as claimed in claim 9, wherein the output template comprises one or more columns, and wherein the one or more columns indicate a test case ID, a test step ID, the one or more controls, a control text, an event, and data associated with each test step.

16. The method (300) as claimed in claim 9, wherein the execution is performed using an Automation Engine.

\* \* \* \* \*